United States Patent Office 3,382,198
Patented May 7, 1968

3,382,198
COMPOSITION FOR EXTRUDABLE DECORATIVE SURFACE COVERING
Cleon M. Elslager, Mountville, Pa., assignor to Armstrong Cork Company, Lancaster, Pa., a corporation of Pennsylvania
No Drawing. Filed June 11, 1964, Ser. No. 374,267
10 Claims. (Cl. 260—23)

This invention relates to a thermoplastic vinyl resin composition which is especially adapted for the manufacture of resilient surface coverings, in particular decorative surface coverings for floors, walls, and the like. It more specifically relates to a composition which can be processed, after mixing and fusing, over a wide range of temperatures. The composition is unique in that it can be easily calendered directly onto thin to heavy gauge backing materials such as paper, felt, and cloth; the calendered composition exhibiting excellent wear properties in surface coverings produced therefrom.

In recent years many thermoplastic vinyl resin formulations based on plasticized polyvinyl chloride and plasticized copolymers of vinyl chloride and vinyl acetate have been developed for forming resilient surface coverings. The development of such formulations has been extremely successful and the greatest proportion of today's resilient surface coverings are manufactured from such formulations. However, present vinyl resin formulations based on plasticized polyvinyl chloride and plasticized copolymers of polyvinyl chloride and polyvinyl acetate have certain inherent disadvantages. Thus formulations developed to date have not possessed characteristics whereby they can be easily calendered directly to felt backing materials without destroying the backing. In order to develop the proper degree of fluidity with present day formulations, an excess of plasticizer is necessary and such excess plasticizer, which gives the compositions fluidity, after mixing and fusing, over a wide range of temperatures, is severely detrimental to the wearing properties of the finished products formed therefrom. Thus the techniques by which surface coverings produced from formulations developed to date have been limited in many aspects.

The primary object of this invention is to provide a novel thermoplastic vinyl resin formulation having unique properties in that the formulations, after mixing and fusing, are capable of being processed over a wide range of temperatures.

A further object is to provide formulations which when calendered possess a degree of fluidity at the processing temperature such that they may be calendered directly to felt type backing materials without destroying the backing and which, after calendering and cooling, form surface coverings which possess excellent wear characteristics.

An ancillary object of the invention is the provision of a thermoplastic vinyl resin formulation which can be processed after mixing and fusing over a wide range of temperatures at which might be considered a normal plasticizer level, thus making the compositions adaptable for a wide variety of manufacturing techniques.

These and other objects of this invention will become more apparent from the disclosure which follows, which disclosure includes several specific embodiments of the invention.

The objects of this invention have been achieved by the use of a vinyl resin formulation having, as a basic resin ingredient, a polyvinyl chloride homopolymer, a copolymer of vinyl chloride and vinyl acetate, or mixtures thereof. Based on 100 parts by weight of the resin selected from said homopolymer, copolymer, and mixtures thereof, the formulations of this invention are comprised of:

10 to 30 parts by weight of a monomeric vinyl resin plasticizer
4 to 8 parts by weight of a vinyl resin stabilizer
2 to 6 parts by weight of stearic acid
4 to 10 parts by weight of a resin selected from the group consisting of an ethylene-alkyl acrylate copolymer, an ethylene-vinyl acetate copolymer or mixtures thereof
5 to 20 parts by weight of a polymeric vinyl resin plasticizer and
0 to 600 parts by weight of pigment and filler.

The primary resin in the novel formulation is a resin selected from the group consisting of polyvinyl chloride homopolymers, copolymers of vinyl chloride and vinyl acetate containing up to 15% vinyl acetate in the copolymer molecule, and mixtures thereof. As the monomeric vinyl resin plasticizer, typical plasticizers such as dioctyl phthalate, butyl benzyl phthalate, and butyl octyl phthalate may be used.

The ethylene-alkyl acrylate copolymer resins utilized in the formulations of this invention are copolymer resins containing from about 2% to about 65% by weight of the alkyl acrylate component. In particular, the alkyl acrylate can be defined more clearly by the general formula $CH_2CHCOOR$ where R designates a linear or branch-chained alkyl radical preferably containing from about 1 to about 20 carbon atoms and more preferably from about 1 to about 12 carbon atoms. Typical of these alkyl acrylates are methyl acrylate, ethyl acrylate, propyl acrylate, butylene acrylate, 2-ethyl hexyl acrylate, and octadecyl acrylate. An ethylene-vinyl acetate copolymer may also be used in place of all or part of the ethylene-alkyl acrylate copolymer. Generally speaking, it is preferred to use ethylene copolymer resins selected from the above class which have melt indexes of from 3 to 100. The melt indexes are a measure of the molecular weight and are determined in accordance with ASTM D1238–57T (grams per 10 minutes at 44 p.s.i. at 190° C.).

Of the polymeric vinyl resin plasticizers which constitute a necessary ingredient in the resin formulations of this invention, high molecular weight polymeric plasticizers have molecular weights in the range of from 1500 to 5000 are utilized and plasticizers selected from the group consisting of condensation polymers of 1,3 butylene adipate and condensation polymers of 1,4 butylene adipate are preferable.

The vinyl resin stabilizers utilized in the formulations of this invention are standard stabilizers such as mixed cadmium-barium laurates and caprates and tin stabilizers such as tin maleate. The usual pigments and fillers utilized in vinyl resin formulations for resilient surface coverings may also be utilized in the formulations of this invention.

In order that the invention may be more readily understood, the following examples will set forth specific embodiments of the formulations of this invention including detailed descriptions of processing techniques, temperatures, and times showing the utilization of these formulations in the production of decorative surface coverings. All parts are by weight unless otherwise specified.

EXAMPLE 1

The following formulation was used to form a mix.

| Ingredient | Parts by weight |
|---|---|
| Vinyl chloride-vinyl acetate copolymer containing about 13% vinyl acetate and 87% vinyl chloride (specific viscosity of 0.186)[1] | 19.93 |
| Vinyl chloride homopolymer (specific viscosity of 0.254 in nitrobenzene) | 80.07 |
| Dioctyl phthalate | 13.47 |
| Condensation polymer of 1,3 butylene adipate, M.W. of about 1500 | 16.61 |
| Ethylene ethyl acrylate copolymer containing about 18% ethyl acrylate having a melt index of 6 [2] | 4.43 |
| Stearic acid | 4.43 |
| Barium-cadmium caprate stabilizer | 4.80 |

[1] Specific viscosities given are for a .4% solution by weight of polymer or copolymer in nitrobenzene unless otherwise indicated.
[2] All melt indexes are determined in accordance with ASTM D1238–57T (grams per 10 minutes at 44 p.s.i. at 190° C.).

All of the ingredients were mixed and fused in a Banbury mixer at about 300° F. and fed to a 30″ mill, the respective rolls of which were maintained at 260° F. and 280° F. The mill was used to form a constant supply of fused composition, which was then fed in a calender nip, sufficient composition being fed to maintain an excess and constant amount of composition at the nip.

The two rolls of the calender were maintained at elevated temperatures, 210° F. for the top roll and 230° F. for the bottom roll. A rubber impregnated asbestos felt backing sheet, rotogravure printed on the upper side, was passed over the lower roll and the mix was maintained in a substantially fluid condition in the nip formed by the upper calender roll and the printed surface of the backing felt. The opening was adjusted at the nip so that a coating of about 15 mils of vinyl resin was calendered directly to the printed felt. Because of the fluid nature of the composition low loads were required in calendering. On cooling, the calendered coating formed a clear, tough, flexible wear resistant surfacing layer through which the print was clearly visible. It exhibited excellent resistance to indentation and abrasion, resisted staining, and showed excellent dimensional stability.

The size of the nip can be readily adjusted to give coatings down to 4 mils or less in thickness and no blisters are encountered in the coatings so formed. The gauge of the wear coat is easily adjusted to a thickness of from 5 to 50 mils with no detrimental effects to the backing or to the quality of the face of the wear layer.

By way of comparison, all standard plasticized polyvinyl compositions now available would have to be so highly plasticized, in order to form a fluid composition which could be successfully calendered to a felt substrate at workable temperatures, that the qualities of the wear layer would be severely affected. Such wear layers would be easily marked or stained and dirt would be readily imbedded therein. Thus present techniques to accomplish the same purpose resort to the use of liquid ssytems such as aqueous latexes or organosols which have to be fused at elevated temperatures or to the use of laminating techniques with attendant disadvantages.

EXAMPLE 2

The following is an example of a pigmented composition which, after mixing and fusing, can be calendered directly to a paper backing to give an opaque wear layer.

| Ingredient | Parts by weight |
|---|---|
| Vinyl chloride-vinyl acetate copolymer containing about 97% vinyl chloride and 3% vinyl acetate (specific viscosity of 0.423) | 35.67 |
| Vinyl chloride-vinyl acetate copolymer containing about 87% vinyl acetate and 13% vinyl chloride (specific viscosity 0.186) | 64.33 |
| Dioctyl phthalate | 13.47 |
| Condensation polymer of 1,3 butylene adipate, M.W. of about 1500 | 5.81 |
| Barium-cadmium caprate stabilizer | 5.15 |
| Stearic acid | 3.17 |
| Ethylene ethyl acrylate copolymer containing about 18% ethyl acrylate having a melt index of 6 | 4.49 |
| TiO$_2$ | 4.00 |

Again the several ingredients were mixed and fused in a Banbury mixer for a sufficient time to form a homogeneous mix. The mix was fed directly to a calender and excess mix was maintained in the nip formed by the upper roll of the calender and a backing felt which was passed through the calender in contact with the bottom calender roll. In this instance a clay coated kraft paper 15 mils in thickness was utilized as the felt carrier. The upper calender roll was maintained at 240° F. and the lower roll at 260° F. The opening at the nip was adjusted so that a 28 mil thick opaque white wear layer was calendered directly onto the paper backing forming a smooth blister-free surface having excellent wear properties. The wear layer showed good adherence to the clay coated paper backing although the clay acts as a separating agent and the vinyl wear layer may be readily stripped from the paper if desired. Again the calendering operation had no deleterious effect on the felt backing.

The following formulations are illustrative of filled and unfilled vinyl resin mixes which, after mixing and fusing, can be calendered directly to backing layers to form homogeneous vinyl resin wear layers having excellent wear characteristics.

EXAMPLE 3

| Ingredient | Parts by weight |
|---|---|
| Vinyl chloride-vinyl acetate copolymer resin containing about 87% vinyl chloride and 13% vinyl acetate (specific viscosity 0.186) | 20.04 |
| Vinyl chloride homopolymer (specific viscosity 0.254) | 79.96 |
| Dioctyl phthalate | 13.45 |
| Barium-cadmium caprate stabilizer | 4.99 |
| Limestone (50 mesh) | 203.19 |
| Condensation polymer of 1,4 butylene adipate, M.W. of about 1500 | 16.57 |
| Ethylene vinyl acetate copolymer resin containing about 18% vinyl acetate having a melt index of 20 | 4.44 |
| Stearic acid | 4.44 |

EXAMPLE 4

| Ingredient | Parts by weight |
|---|---|
| Vinyl chloride-vinyl acetate copolymer resin containing about 95% vinyl chloride and 5% vinyl acetate (specific viscosity 0.296) | 1.00 |
| Ethylene ethyl acrylate copolymer resin containing about 18% ethyl acrylate having a melt index of 6 | 5.00 |
| Stearic acid | 5.00 |
| Condensation polymer of 1,4 butylene adipate, M.W. of about 1500 | 7.50 |
| Butyl benzyl phthalate | 20.01 |
| Barium-cadmium caprate | 5.00 |

The compositions of this invention may be readily mixed and fused in standard mixing equipment such as a Banbury mixer at temperatures in the range of 275° F. to 350° F. It is then preferable to mill the fused mix from the mixer at temperatures of from 180° F. to 350° F. A unique property of the compositions of this invention resides in the fact that it can be processed, after mixing and fusing, over a wide range of temperatures and calender temperatures ranging from 180° F. to 350° F. may be used with good roll release being effected.

EXAMPLE 5

The following formulation was used to form a mix.

| Ingredient | Parts by weight |
|---|---|
| Vinyl chloride homopolymer (specific viscosity of 0.245) | 80.1 |
| Vinyl chloride-vinyl acetate copolymer containing about 87% vinyl chloride and 13% vinyl acetate (specific viscosity of 0.186) | 19.9 |
| Dioctyl phthalate | 13.6 |
| Condensation polymer of 1,3 butylene adipate having a molecular weight of about 1500 | 16.7 |
| Ethylene ethyl acrylate copolymer containing about 18% ethyl acrylate | 4.5 |
| Stearic acid | 4.5 |
| Barium-cadmium caprate stabilizer | 4.8 |
| Sodium potassium aluminum silicate filler | 54.4 |
| Titanium dioxide pigment | .14 |
| Phthalocyanine pigment (blue) | .03 |

All of the ingredients were mixed and fused in a Banbury mixer at about 300° F. and fed to a 30″ mill, the top and bottom rolls of which were respectively maintained at 260° F. and 280° F. The mill again was used to form a constant supply of fused composition which was in turn fed into a calender nip, sufficient composition being fed to maintain an excess and constant amount of composition at the nip.

The two rolls of the calender were maintained at elevated temperatures, 220° F. for the top roll and 240° F. for the bottom roll, and the mix was maintained in a substantially fluid condition at the nip formed by the calender rolls. The fluid mix was fed between the calender rolls to form a 12 mil thick sheet which was taken off the lower calender roll unsupported and guided over idler rolls and thus cooled. The cooled sheet, which was of excellent quality and relatively free of stresses and strains, was cut into 5″ x 1¾″ ribbons which were frozen with Dry Ice and fed to a Fitz Mill where they were ground into irregularly shaped chips which were sized to give chips averaging about 5/16″ to 3/8″ in size.

The chips, which were of a translucent blue appearance, were utilized in forming a decorative surface covering in accordance with the following:

Particles of unfused resin, plasticizers, and stabilizers of the following composition,

| Ingredient | Parts by weight |
|---|---|
| Vinyl chloride-vinyl acetate copolymer containing 93% vinyl chloride and 7% vinyl acetate (specific gravity 0.230) | 77 |
| Epoxidized soybean oil | 4 |
| Dioctyl phthalate | 5 |
| Sucrose acetate isobutyrate | 11 |
| Phenyl phosphite stabilizer | 2 |
| Barium-cadmium caprate stabilizer | 1 | were fed evenly to a thickness of about 30 mils onto a rubber impregnated asbestos felt and the above-described translucent blue chips were randomly positioned on the surface thereof. The coated felt was then passed under radiant heaters to heat and fuse the resin particles at about 350° F. and the coated felt with the heated background resin and chips was then consolidated and cooled, forming a homogeneous decorative vinyl layer 40 mils thick firmly bonded to the backing felt. Because the chips were relatively free from stresses and strains they did not distort or curl when the high heat was applied and on consolidation the chips knitted well into the background sheet formed from the particles above described. The chips exhibited excellent dimensional stability and no breaks were effected, even by repeated flexing, at the chip line in the consolidated decorative sheet.

I claim:

1. A plasticized and stabilized vinyl resin composition comprising a homogeneous mixture of, in relative proportions:
   (a) 100 parts by weight of a vinyl resin selected from the group consisting of vinyl chloride homopolymer, copolymers of vinyl chloride and vinyl acetate, and mixtures thereof;
   (b) 10 to 30 parts by weight of a monomeric vinyl resin plasticizer;
   (c) 2 to 6 parts by weight stearic acid;
   (d) 4 to 10 parts by weight of a member selected from the group consisting of an ethylene-alkyl acrylate copolymer containing from about 2% to about 65% by weight of the alkyl acrylate component, said alkyl acrylate being of the formula $CH_2CHOOR$ where R is an alkyl radical selected from the group consisting of linear and branch chain alkyl radicals of from 1 to 20 carbon atoms, an ethylene-vinyl acetate copolymer containing about 18% vinyl acetate and mixtures thereof;
   (e) 4 to 8 parts by weight vinyl resin stabilizer;
   (f) 5 to 20 parts by weight of a polymeric plasticizer having a molecular weight greater than about 1500; and
   (g) 0 to 600 parts by weight pigment and filler, said resin components being present in said composition in a fused state.

2. A composition in accordance with claim 1 in which one of said resin components is an ethylene-alkyl acrylate copolymer.

3. A composition in accordance with claim 2 in which said polymeric plasticizer is a condensation polymer of 1,3 butylene adipate.

4. A composition in accordance with claim 3 in which said ethylene-alkyl acrylate copolymer is a copolymer of ethylene and ethyl acrylate containing about 18% of the ethyl acrylate component.

5. A composition in accordance with claim 2 in which said polymeric plasticizer is a condensation polymer of 1,4 butylene adipate.

6. A composition in accordance with claim 5 in which said ethylene-alkyl acrylate copolymer is a copolymer of ethylene and ethyl acrylate containing about 18% of the ethyl acrylate component.

7. In the method of manufacturing a thermoplastic vinyl resin sheet, the improvement comprising mixing, at a temperature sufficient to fuse the resin components, a composition comprised of, in relative proportions:
   (a) 100 parts by weight of a vinyl resin selected from the group consisting of vinyl chloride homopolymer, copolymers of vinyl chloride and vinyl acetate, and mixtures thereof;
   (b) 10 to 30 parts by weight of a monomeric vinyl resin plasticizer;
   (c) 2 to 6 parts by weight stearic acid;
   (d) 4 to 10 parts by weight of a member selected from the group consisting of an ethylene-alkyl acrylate copolymer containing from about 2% to about 65% by weight of the alkyl acrylate component, said alkyl acrylate being of the formula $CH_2CHOOR$ where R is an alkyl radical selected from the group consisting of linear and branch chain alkyl radicals of from 1 to 20 carbon atoms, an ethylene-vinyl acetate copolymer containing about 18% vinyl acetate and mixtures thereof;
   (e) 4 to 8 parts by weight vinyl resin stabilizer;
   (f) 5 to 20 parts by weight of a polymeric plasticizer having a molecular weight greater than about 1500; and
   (g) 0 to 600 parts by weight pigment and filler; and calendering said composition at a temperature of from about 180° F. to 350° F.

8. The method in accordance with claim 7 in which said composition is calendered directly to a backing felt to form a thermoplastic vinyl resin wear layer bonded directly to a backing layer;

9. The method in accordance with claim 7 in which the composition is mixed and fused at a temperature in the range of from about 275° F. to 350° F.

10. A thermoplastic design element formed by reducing a calendered sheet produced in accordance with claim 7 to a desired chip size.

References Cited

UNITED STATES PATENTS

| | | | |
|---|---|---|---|
| 3,224,996 | 12/1965 | Balmer et al. | 260—31.8 |
| 3,277,042 | 10/1966 | Richart | 260—31.8 |
| 2,558,378 | 6/1951 | Petry | 260—41 |
| 2,708,215 | 5/1955 | Kaganoff | 260—23 |
| 2,773,851 | 12/1956 | Tolman | 260—31.8 |
| 2,899,398 | 8/1959 | Pflaumer | 260—23 |
| 2,926,100 | 2/1960 | Weigle et al. | 117—140 |
| 2,980,642 | 4/1961 | Bushnell et al. | 260—31.6 |
| 3,015,640 | 1/1962 | Weaver et al. | 260—31.8 |
| 3,055,867 | 9/1962 | Le Bras et al. | 260—45.7 |
| 3,062,778 | 11/1962 | Van Cleve et al. | 260—897 |
| 3,125,545 | 3/1964 | Van Cleve et al. | 260—897 |

OTHER REFERENCES

Doolittle, "The Technology of Solvents and Plasticizers" (1954), p. 1011.

DONALD E. CZAJA, *Primary Examiner.*

R. A. WHITE, *Assistant Examiner.*